J. Evans.

Refining Iron and Steel.

No. 1,544. Reissued Sept. 29, 1863.

Witnesses;
Hubbard Berle
Rufus Langford

Inventor;
John Evans
By his Atty
John E. Earle

UNITED STATES PATENT OFFICE.

JOHN EVANS, OF NEW HAVEN, CONNECTICUT.

IMPROVED FORGE-FIRE.

Specification forming part of Letters Patent No. 37,958, dated March 24, 1863; Reissue No. 1,544, dated September 29, 1863.

*To all whom it may concern:*

Be it known that I, JOHN EVANS, of New Haven, in the county of New Haven and State of Connecticut, have invented a new and Improved Closed Lehigh Forge-Fire; and I do hereby declare the following to be a full, clear, and exact description of the construction and operation of the same, when taken in connection with the accompanying drawings and the letters of reference marked thereon, and which said drawings constitute part of this specification, and represent, in—

Figure 1:
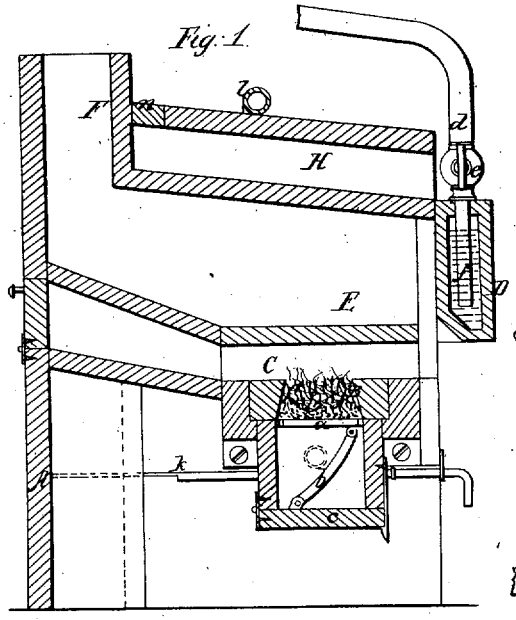
Figure 3:
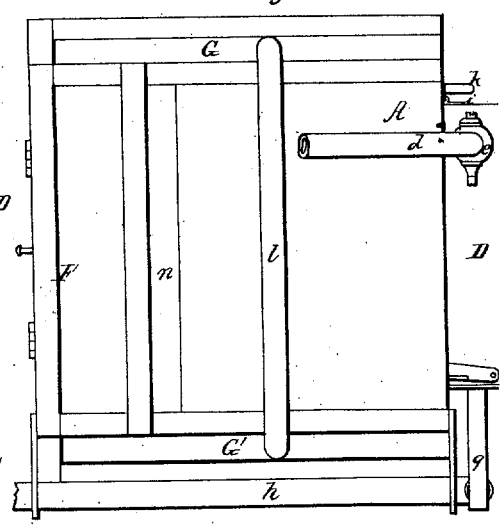
Figure 2:
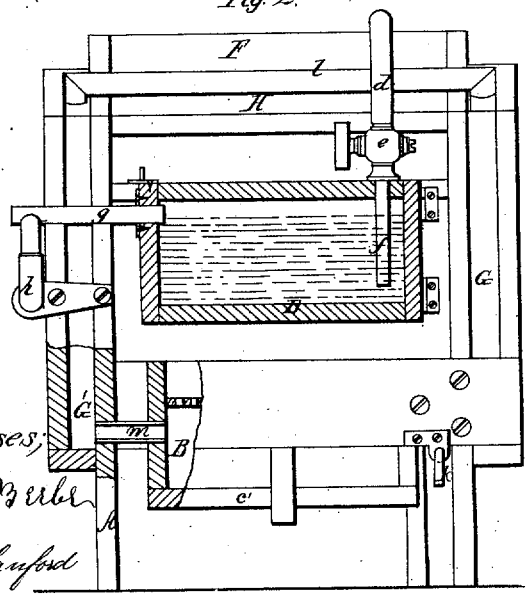

Figure 1, a longitudinal vertical section; Fig. 2, a front elevation of the same, partly in section; and Fig. 3, a plan or top view of the same.

Similar letters and characters indicate like parts in the three views.

This invention consists in the arrangement of a hollow water-chamber front in such relation to the fire-place of a "Lehigh" fire and to the flue leading from said fire-place to the chimney or smoke-stack, and applied in such a manner that the fire is inclosed on all sides except the front, thereby causing the gases to come to the front, when the same, by coming in contact with the cold air and chamber-front, form a combustible mixture, which acts as a part of the fuel.

The invention consists, further, in the arrangement of hollow air-chambers surrounding the fire on all sides, and supplied with a current of cold air, which serves for the blast, in such a manner that the persons working at or near the fire are protected against the heat, which, in Lehigh fires of the ordinary construction, radiates from the walls to the great inconvenience and injury of the health of the workmen employed at or near said fire.

To enable those skilled in the art to make and use my invention, I will proceed to describe it with reference to the drawings.

A represents a Lehigh fire of the ordinary construction, built up of brick and cast-iron plates, or any other suitable material, and commonly used for heating large pieces of steel, iron, or other metal. B is the fire place, which is provided with a tilting grate, *a*, that connects by a curved rod, *b*, with the fringed bottom *c* of the ash-pan, so that by opening or closing said bottom the grate is lowered or raised. The said hinged bottom closes tight and forms the bottom of a chamber below the fire, into which the block is introduced. The products of combustion, which rise from the fire in the fire-place, escape to the chamber C, which, being closed at its rear and on its sides and top, throws the gases to the front of the fire, where the same meet the hollow water-chamber front D. This front is supplied with water through a flexible pipe, *d*, which connects with a stop-cock, *e*, and from this cock a tube, *f*, extends nearly down to the bottom of the chamber D, as clearly shown in Figs. 1 and 2 of the drawings. A pipe, *g*, passing out through the side of said chamber near to its top, conducts the heated water out to the waste-pipe *h*. A continuous stream of cold water is thus passed through the chamber D, and thereby the said chamber is kept cool. The gases, in coming in contact with the lower chamfered edge of the chamber D, are thrown down and caused to mingle with atmospheric air, so that they form a combustible mixture, which increases the efficiency of the fuel. The products of combustion pass up under the edge of the chamber D to the flue E, and through it to the chimney F.

The hollow water-chamber front D is connected to the body of the Lehigh fire by hinges *i*, or in any other desirable manner, so that it can be thrown open or removed whenever it may be desirable. The sides of the fire A are protected by air-chambers G G′, to which air is admitted through a channel, *j*, from below, said channel being provided with a sliding stop-valve, *k*, so that it can be opened or closed at pleasure. Through this channel the air is introduced to one of the air-chambers, G, which communicates with the other, G′, through a pipe, *l*, extending across the top of the fire, as clearly shown in Figs. 2 and 3 of the drawings. From the air-chamber G′ a tube, *m*, conducts the air under the grate *a* in the fire-place B. By these means a continuous current of cold air passes through the air-chambers, and the outside walls of the fire are kept comparatively cool. The top of the flue F is also protected by an air-chamber, H, to which cold air is admitted in front, and from which the air escapes through an aperture, *n*, in the rear.

The operation is as follows: A stream of cold water is constantly passed through the hollow front D, keeping the same at a pretty low temperature. When the gases rising from the fire strike the edge of this chamber-front, they mingle with the atmospheric air and form a combustible mixture, which serves as a part of the fuel. In the old method of constructing Lehigh fire, without the front, the fire is frequently forced out at distance of two feet, to the great discomfiture of the workmen, whereas my chamber-front acts as a guard, thus enabling me to stand in front with comfort in the hottest days in summer. Besides this advantage, with my improvement all the gases are consumed, which, with Lehigh fires of the ordinary construction, escape into the building, to the great inconvenience and injury of the health of the persons employed at or near the fire. Furthermore, by the use of the air-chambers the whole outside of the furnace can be kept cool, and the heat of the fire is concentrated and no part of it wasted. In short, by my improvements a considerable percentage of fuel is saved, and the workmen can do more work and with less injury to their health than they can with Lehigh fires of ordinary construction.

What I claim as new, and desire to secure by Letters Patent, is—

1. An inclosed Lehigh forge-fire, substantially in the manner and for the purpose herein set forth.

2. The arrangement of the hollow water-chamber front D, in combination with the fire-place B of a Lehigh fire, A, constructed and applied substantially as and for the purpose set forth.

3. The combination of the air-chambers G G′, in combination with the fire-place B of a Lehigh fire, A, and communicating with the air-supply channel *j* and discharge-pipe or tuyere *m*, the whole being constructed and operating substantially as and for the purpose specified.

JOHN EVANS.

Witnesses:
JOSEPH KAY,
JOHN E. EARLE.